Aug. 31, 1937. D. V. OESTERLING 2,091,875
METALLIC NAILING STRUCTURAL MEMBER
Filed July 7, 1936  2 Sheets-Sheet 1

Inventor,
Donald V. Oesterling,
By
Attorney

Aug. 31, 1937. D. V. OESTERLING 2,091,875
METALLIC NAILING STRUCTURAL MEMBER
Filed July 7, 1936 2 Sheets-Sheet 2
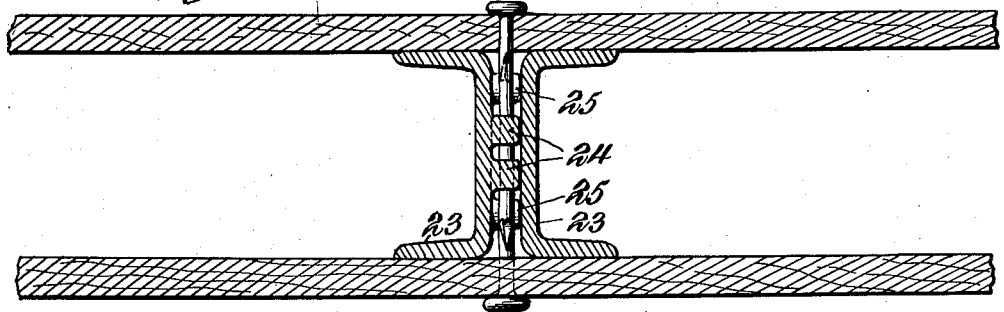
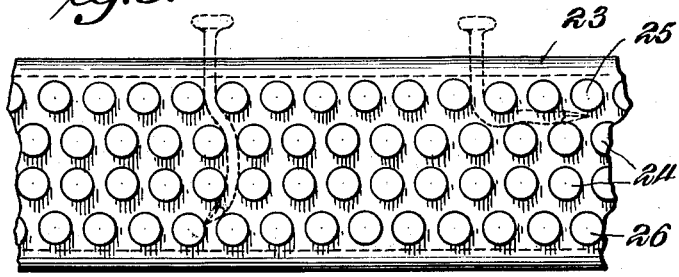
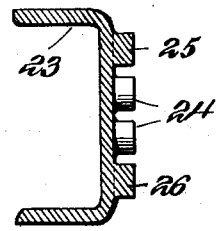
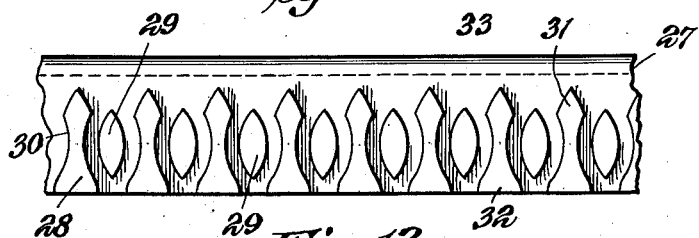
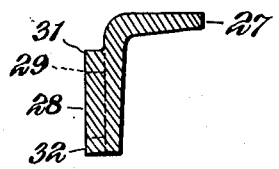
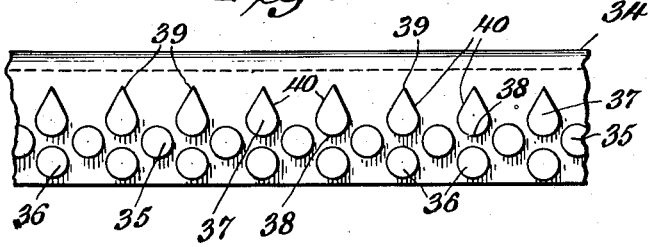
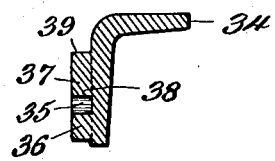
Inventor,
Donald V. Oesterling,
By
Attorney Patented Aug. 31, 1937

2,091,875

UNITED STATES PATENT OFFICE 2,091,875

METALLIC NAILING STRUCTURAL MEMBER

Donald V. Oesterling, Washington, D. C.

Application July 7, 1936, Serial No. 89,279

5 Claims. (Cl. 189—34)

The invention relates to a metallic nailing structural member.

The object of the present invention is to provide a simple, practical and highly efficient metallic nailing member adapted to be easily and cheaply constructed by a rolling process and designed to be secured to a flat face of a structural member to form a compound structural member to which collateral material may be attached by the use of nails or similar fastening devices.

A further object of the invention is to provide a nailing member of this character equipped with a longitudinal series of transversely disposed serpentine ribs forming serpentine nail receiving voids and adapted to cause nails driven between them to bend in conformity with the serpentine voids whereby the nails are securely gripped and locked in the nail receiving member.

Another object of the invention is to provide a metallic nailing member having guiding means adapted to cause nails driven into a board or other collateral material at any point along the series of ribs to enter the serpentine voids so that a nail will find its way into one of the serpentine spaces or grooves between the ribs no matter where it is driven through a board providing it is in line with the series of ribs.

A further object of the invention is to provide a nailing member adapted to cause the internal forces created by the bending of a nail as it curves itself along the void between two serpentine ribs to be contained wholly within the nailing member between the serpentine ribs and not have any tendency to separate the nailing member from the structural member to which such nailing member may be secured in the formation of a compound structural member.

With these and other objects in view, the invention consists in the construction and novel combination and arrangement of parts hereinafter fully described, illustrated in the accompanying drawings and pointed out in the claims hereto appended, it being understood that various changes in the form, proportion and details of construction, within the scope of the claims, may be resorted to without departing from the spirit or sacrificing any of the advantages of the invention.

In the drawings:—

Fig. 8 is a sectional view of a compound structural member having nails driven into it from opposite sides of the compound member for securing collateral material to the same.

Fig. 9 is a plan view of a metallic nailing member having nail engaging protuberances in the form of staggered rows of circular bosses.

Fig. 10 is a transverse sectional view of the modification shown in Fig. 9.

Fig. 11 is a plan view of a metallic nailing member illustrating another modification of the invention in which serpentine voids or spaces are formed by ribs and bosses.

Fig. 12 is a transverse sectional view of the same.

Fig. 13 is a plan view showing another form of the invention in which the serpentine voids are formed by circular bosses and bevelled bosses.

Fig. 14 is a transverse sectional view of the modification shown in Fig. 13.

In the accompanying drawings, in which is illustrated the preferred embodiments of the invention 1 designates a metallic nailing structural member consisting of an angle bar provided at the outer face of its flange 2 with a longitudinal series of transversely disposed serpentine ribs 3 spaced apart and arranged in parallelism to form serpentine voids or spaces 4 between them for the reception of nails or similar fastening devices such as staples. The angle bar may be provided at one or both of the flanges with serpentine ribs 3 and it may be constructed of steel, aluminum bronze or any other metal which may be rolled into the desired shape.

Figure 6:
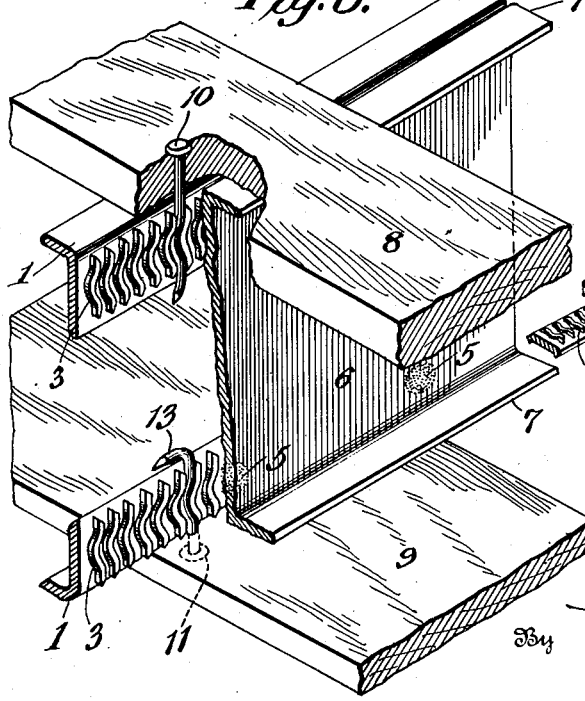
Fig. 6 is a perspective view partly broken away of a compound structural member provided with nailing members of the form illustrated in Figs. 1 to 3, inclusive, of the drawings.

The member 1 when attached by welding, riveting, bolting or any other suitable means to any flat surface of a metal structural member will produce a compound structural member to which collateral materials may be attached by nails, as illustrated in Fig. 6 of the drawings. In Fig. 6 one of the nailing members 1 is secured by spot welding 5 to a structural member 6 which is in the form of a beam having its flanges 7 extending from the opposite face to that to which the angle members 1 are secured. A composite I-beam is formed by the beam 6 and the nailing members 1 for enabling boards 8 and 9 to be secured by nails 10 and 11 to the structural composite I-beam formed by the beam 6 and the members 1.

The serpentine shaped ribs are tapered laterally at one or both ends 12 to a reasonably sharp edge at the point where the nail will enter the serpentine spaces or voids of the compound member so that any nail when driven between the two elements of the compound member will be guided into one of the serpentine shaped voids between the ribs and will bend itself along the course of the void and by so doing fasten itself and any collateral material through which it has previously passed, securely to the compound metallic member. The parallel serpentine ribs cause a nail to be successively bent in opposite directions and are so shaped that it is impossible for a nail, of any diameter less than the distance between two ribs, to pass along the void or space between the ribs without being bent and thus fastening itself securely within the member. This enables the use of any type of nail of sufficient length to penetrate the member and of a diameter equal to or less than the smallest cross sectional dimension of the void. Nails of sufficient length to extend beyond the nailing member may be used and after being driven into the nailing member the terminal 13 may be bent over and clinched against the inner edge of the flange or portion having the serpentine ribs, although this clinching or bending of the inner end of the fastening is not necessary for effective anchorage of the fastening, the free end of the fastening automatically bends following out the line of curvature. The serpentine grooves are adapted to cause the terminal 13 to curve laterally so that the end of the nail will not be driven into material at the opposite side of the nailing member but will curl up without penetrating the same.

The angle bar 1 is slightly curved at 14 at the juncture of its flanges so that when it is applied to a structural member, as illustrated in Fig. 6 of the drawings, a tapered entrance space 15 leading to the nail receiving voids is formed. The laterally tapered ends 12 of the ribs 3 present a sharp edge to the ends of the nails entering the nailing member so that it is impossible for the ends of the ribs to form an abutment and cause the nail to bend without entering a void as the bevelled face 16 of the tapered end will guide the end of a nail into the serpentine space between it and the adjacent rib.

The ribs are of sufficient thickness to enable the nails to be received within the spaces between the ribs and to lie wholly between said ribs. By this construction the internal forces created by a nail as it curves itself along the void between two ribs, are contained wholly within the nailing member, or member having the ribs and do not have a tendency to separate the metallic nailing member from the structural member to which it may be secured. The structural member to which the metallic nailing member is secured fits against the ribs which present flat surfaces to the structural member and the latter closes the spaces between the serpentine ribs forming with the said ribs and the member containing the same, nail receiving sockets.

Figure 1:
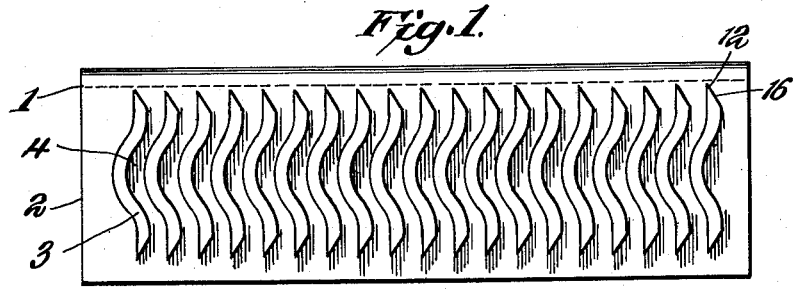
Fig. 1 is a plan view of a metallic nailing structural member consisting of an angle bar constructed in accordance with this invention.
Figure 2:
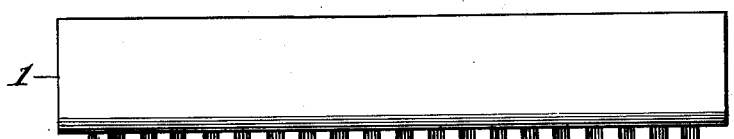
Fig. 2 is a side elevation of the same.
Figure 3:
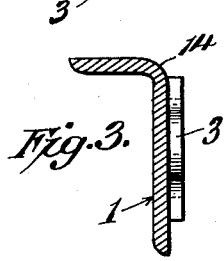
Fig. 3 is a transverse sectional view of the metallic nailing structural member, one of the serpentine ribs being shown in elevation.
Figure 4:
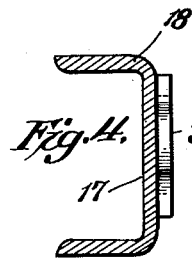
Fig. 4 is a similar view showing the serpentine rib applied to a channel member.
Figure 5:
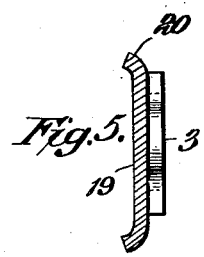
Fig. 5 is a transverse sectional view showing the serpentine rib applied to a substantially plain bar or member.
Figure 7:
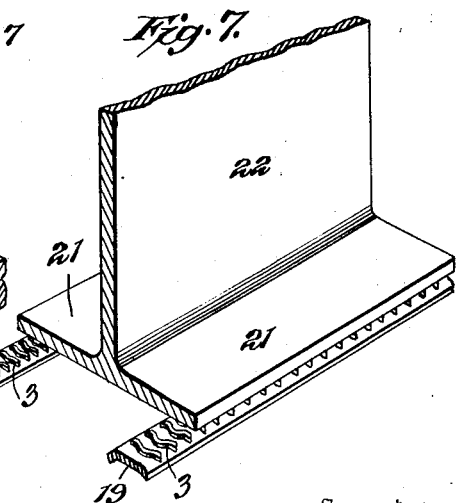
Fig. 7 is a similar view showing a portion of an I-beam provided with nailing members of the form illustrated in Fig. 5 of the drawings.

In Fig. 4 of the drawings the invention is shown applied to the web 17 of a channel member 18 and in Fig. 5 of the drawings the invention is applied to a plain bar or member 19 which is substantially flat with the exception that its end edges 20 are preferably deflected slightly to form a flaring entrance to the serpentine spaces or voids between the ribs when the bar or member 19 is applied to a structural member. In Fig. 7 of the drawings a member 19 is shown applied to each of the bottom flanges 21 of a metallic I-beam 22, the upper portion thereof being broken away. The member having the serpentine ribs applied to one of its flat faces may be of any structural form and may be combined with any structural member having a flat face. This will enable collateral material to be readily nailed to structural elements or members of various forms.

It will be understood that nails or other fastenings may be driven into the voids or spaces between two metallic members united with the voids or spaces therebetween from either longitudinal edge of the compound metallic member as shown for instance in Fig. 8 of the drawings.

In all the forms of the invention heretofore described the ribs preferably terminate at their ends short of the longitudinal edges of the metallic member with which the ribs are formed. In Figs. 9 and 10 of the drawings is illustrated a metallic channel member 23 provided with intermediate rows of circular bosses 24 which are flanked by marginal rows of circular bosses 25 and 26 which are staggered with relation to each of the intermediate rows of bosses 24. The bosses which project from the flat web portion of the channel member 23 present flat faces to fit against a structural member to form a compound structural member in a manner heretofore explained. Said bosses 24, 25, and 26 form serpentine or tortuous nail receiving voids or passages for bending and gripping nails in the manner heretofore explained. The rounded edges or surfaces of the flanking sets of bosses 25 and 26 provide tapered or flaring entrances to the said voids or passages at each of the marginal edges of the metallic nailing member 23 to provide for entrance of a nail or other fastening for serpentine formation or passage of the fastening as it passes through the respective spaces or voids between the bosses 24, 25, and 26 as will be well understood. The bosses 25 and 26 are arranged preferably within the longitudinal edges of the metallic nailing member 23 and the curved outer portions of the edges of said bosses 25 and 26 form guiding means between the members of a compound structural member to insure guidance of a nail or the like between adjacent bosses 25 and 26 as in the case of the tapered ends of the aforesaid ribs.

In Figs. 11 and 12 of the drawings is illustrated another modification of the invention in which the metallic nailing structural member is in the form of an angle bar 27 provided on one of its flanges with alternately arranged transverse ribs 28 and transverse elongated bosses 29 forming intervening substantially serpentine nail receiving spaces or voids and providing flaring entrances to the same for guiding a nail into said spaces or voids. The ribs 28 extend from the outer longitudinal edge of the flange on which they are formed and they terminate short of the opposite longitudinal edge of said flange. The ribs 28 are provided at opposite sides with concave edges 30 and their front ends 31 are oppositely bevelled. The other ends 32 of the ribs 30 extend to and terminate at the longitudinal edge of the flange of the angle bar 27 and are preferably flush with the same as shown and are of greater width than the bevelled ends 31. The bosses 29 are located between the concave side edges of the ribs and are oppositely tapered and present convex side edges 33 which are spaced from and arranged in substantial parallelism with the concave side edges of the ribs and terminate short of the ends of the ribs to form with the ribs substantially serpentine nail receiving passages or voids. The tapered ends 31 of the ribs are bevelled to a relatively sharp edge for guiding nails or other fastenings into the serpentine voids or spaces in a manner similar to the tapered ends of the ribs heretofore described.

In Figs. 13 and 14 of the drawings is illustrated another form of the invention in which the protuberances which form serpentine nail receiving passages or voids are formed on one of the angles of an angle bar 34 consist of rows 35 and 36 of circular bosses and a marginal or flanking row of tapered bosses 37. The circular bosses of the rows 35 and 36 are staggered with relation to one another, the circular bosses of each of the rows 35 and 36 being located opposite the intervals between the bosses of the other row. The tapered bosses 37 are located opposite the intervals between the bosses of the row 35 and have rounded substantially semi-circular inner ends 38 and bevelled outer ends 39 presenting straight inwardly diverging side edges 40 which extend from the front edge of the bosses 37 to the curved edge of the inner end 38. The bosses 35 and 36 form substantially serpentine spaces or voids between them for receiving and bending nails and other fastenings and the tapered bosses 37 form guiding means for guiding nails or other fastenings into the serpentine spaces or voids in a manner similar to the tapered bevelled ends of the ribs heretofore described.

What is claimed is:—

1. An inflexible metallic nailing member having a flat face provided with spaced integral nail engaging protuberances forming tortuous nail receiving voids or spaces between them and presenting flat faces to fit against a flat face of a metallic structural member to form a compound structural member with the tortuous nail receiving voids or spaces interiorly thereof, said tortuous nail receiving voids or spaces being open at the opposite longitudinal edges of the metallic nailing member and having sufficient thickness and presenting to a nail side faces disposed in planes substantially perpendicular to said flat face of the nailing member so that all of the internal forces created by the bending of the nail will be contained within the nailing member and not tend to cause a separation of the nailing member from the structural member.

2. An inflexible metallic nailing member having a flat face provided with spaced circular bosses having side nail engaging faces arranged to form tortuous nail receiving voids or spaces adapted when a nail or other fastening is driven between them to cause a bending and gripping of the same, said nail engaging faces being disposed in planes substantially perpendicular to said flat face of the nail engaging member so that all of the internal forces created by the bending of the nail will be contained within the nailing member and not tend to cause a separation of the nailing member from a structural member to which it may be secured.

3. An inflexible metallic nailing member having a flat side face provided with spaced transverse ribs tapered at one end to present nail guiding edges and having concave side edges extending from said guiding edges and oppositely tapered elongated bosses located between the ribs and having convex side edges disposed in substantial parallelism with the concave edges of the ribs and terminating short of the ends of the ribs and coacting with the latter to provide tortuous nail receiving voids or spaces adapted to cause a bending and gripping of the nail or other fastening, the side edges of the ribs and the bosses being disposed in planes substantially perpendicular to said flat face of the nailing member so that all of the internal forces created by the bending of the nail will be contained within the nailing member and not tend to cause a separation of the nailing member from a structural member to which it may be secured.

4. An inflexible metallic nailing member having a flat face provided with spaced integral nail engaging protuberances forming tortuous nail receiving voids or spaces between them and presenting flat faces to fit against a flat face of a structural member to form a compound structural member with the tortuous nail receiving voids or spaces interiorly thereof, said tortuous nail receiving voids or spaces being open at the opposite longitudinal edges of the metallic nailing member and presenting to a nail side faces disposed in planes substantially perpendicular to said flat face of the nailing member so that all of the internal forces created by the bending of the nail will be contained within the nailing member and not tend to cause a separation of the nailing member from the structural member, said protuberances being tapered to a relatively sharp edge adjacent a longitudinal edge of the inflexible nailing member for guiding nails into the tortuous nail receiving voids or spaces.

5. An inflexible metallic nailing member having a flat face provided with a plurality of rows of spaced circular bosses and having a row of spaced tapered bosses beveled at one end to form guiding means to insure entrance of a nail into the spaces between the bosses, said bosses having nail engaging side faces disposed in planes substantially perpendicular to said flat face of the nailing member so that all of the internal forces created by the bending of the nail will be contained within the nailing member and not tend to cause a separation of the nailing member from a structural member to which it may be secured.

DONALD V. OESTERLING.